(12) United States Patent
Kuriyama

(10) Patent No.: US 11,951,775 B2
(45) Date of Patent: Apr. 9, 2024

(54) PNEUMATIC TIRE

(71) Applicant: Toyo Tire Corporation, Itami (JP)

(72) Inventor: Hikaru Kuriyama, Itami (JP)

(73) Assignee: Toyo Tire Corporation, Itami (JP)

( * ) Notice: Subject to any disclaimer, the term of this patent is extended or adjusted under 35 U.S.C. 154(b) by 0 days.

(21) Appl. No.: 18/092,643

(22) Filed: Jan. 3, 2023

(65) Prior Publication Data

US 2023/0241930 A1    Aug. 3, 2023

(30) Foreign Application Priority Data

Feb. 3, 2022    (JP) .................................. 2022-015753

(51) Int. Cl.
*B60C 13/00*    (2006.01)

(52) U.S. Cl.
CPC .................................. *B60C 13/001* (2013.01)

(58) Field of Classification Search
CPC ..... B60C 13/001; B60C 13/00; B60C 13/002; B60C 13/023
See application file for complete search history.

(56) References Cited

U.S. PATENT DOCUMENTS

| 2007/0034312 A1* | 2/2007 | Matsumoto ........... B60C 13/001 152/523 |
| 2008/0283169 A1 | 11/2008 | Sato et al. |
| 2021/0086565 A1* | 3/2021 | Ishikawa ............... B60C 13/001 |

FOREIGN PATENT DOCUMENTS

JP    2008-273505 A    11/2008

* cited by examiner

*Primary Examiner* — Justin R Fischer
*Assistant Examiner* — Wendy L Boss
(74) *Attorney, Agent, or Firm* — WHDA, LLP

(57) ABSTRACT

A pneumatic tire includes a decorative area 11 provided on a sidewall surface 10, in which three kinds of planes 21, 22, and 23 with different inclinations with respect to a profile surface 20 are tightly arranged in the decorative area 11, two kinds of planes 21, 22, or 23 from the three kinds of planes 21, 22, and 23 are aligned in a first direction to make a pair, plural kinds of pairs with different combinations are aligned in a second direction, and boundaries 24 between each two planes 21, 22, or 23 aligned in the first direction are shifted in the first direction between the pairs adjacent in the second direction.

10 Claims, 14 Drawing Sheets

PNEUMATIC TIRE

CROSS-REFERENCE TO RELATED APPLICATIONS

This application claims the benefit of and priority to Japanese Patent Application 2022-015753 filed on Feb. 3, 2022, and the content thereof is incorporated herein by reference in its entirety.

BACKGROUND OF THE INVENTION

1. Field of the Invention

The present invention relates to a pneumatic tire.

2. Description of the Related Art

There has been known a pneumatic tire provided with a pattern formed of irregularities on a sidewall surface. Most of patterns formed of irregularities are made by arranging many ridges extending in straight lines at equal intervals. Moreover, a pattern in which many portions with the same three-dimensional shape are arranged has been also known. For example, a pattern disclosed in JP-A-2008-273505 is made by arranging many portions with a square pyramid shape respectively as recessed surfaces with respect to a reference surface.

SUMMARY OF THE INVENTION

Incidentally, beautiful patterns have been frequently proposed; however, an innovative pattern to create new-type visual effects has not been frequently proposed.

In view of the above, an object of the invention is to provide a pneumatic tire in which new visual effects can be created.

According to an aspect of the invention, there is provided a pneumatic tire that includes a decorative area provided on a sidewall surface, in which three kinds of planes with different inclinations with respect to a profile surface are tightly arranged in the decorative area, two kinds of planes from the three kinds of planes are aligned in a first direction to make a pair, plural kinds of pairs with different combinations are aligned in a second direction, and boundaries between each two planes aligned in the first direction are shifted in the first direction between the pairs adjacent in the second direction.

Due to the above features, new visual effects are created by the pneumatic tire according to the embodiment.

DESCRIPTION OF EMBODIMENTS

Figure 1:
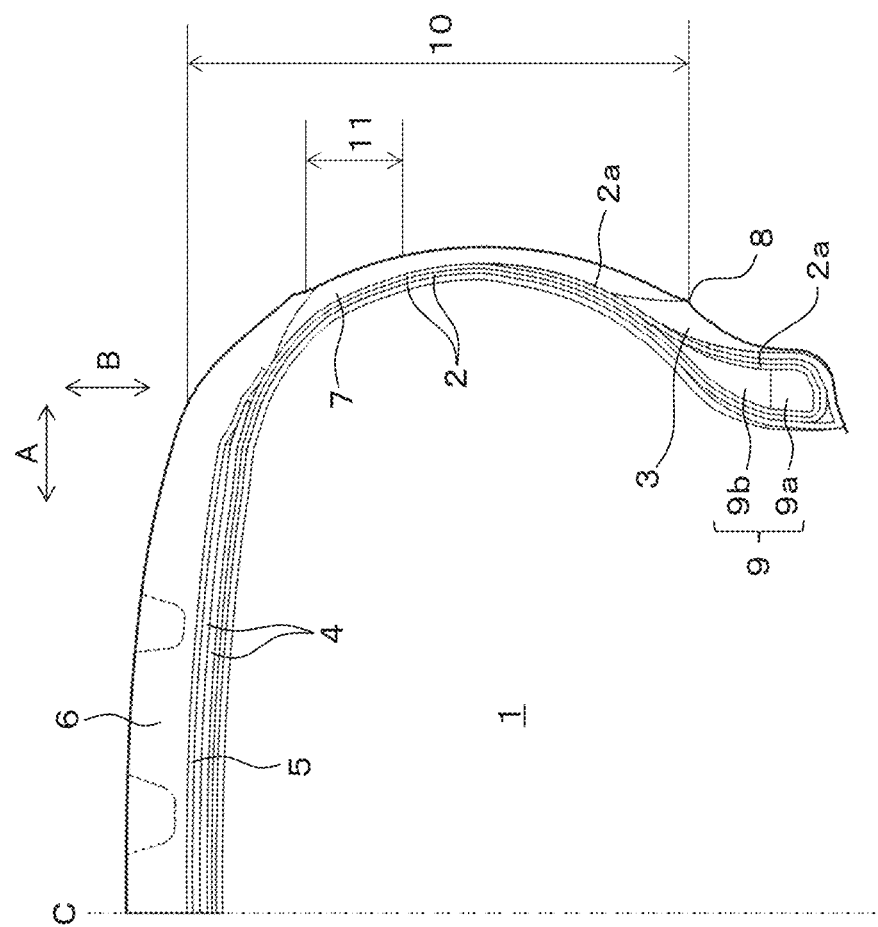
FIG. 1 is a half cross-sectional view of a pneumatic tire in an axial direction.

FIG. 1 shows a cross-sectional structure of a pneumatic tire 1 according to an embodiment. FIG. 1 shows only a half of the structure in a tire axial direction, and the actual pneumatic tire 1 is approximately right-and-left symmetrical with respect to a center line C. The tire axial direction is denoted by an arrow A in FIG. 1, a tire radial direction is denoted by an arrow B in FIG. 1 and FIG. 2, and a tire circumferential direction is denoted by an arrow R in FIG. 2, respectively.

The pneumatic tire 1 is provided with bead parts 9 on both sides in the tire axial direction. Each bead part 9 includes a bead core 9a formed of steel wire wound in a circular shape and a rubber bead filler 9b provided on an outer side in a radial direction of the bead core 9a.

One or two carcass plies 2 are hung across the bead parts 9 on both sides in the tire axial direction. The carcass ply 2 is a sheet-shaped member in which many ply cords aligned in a direction orthogonal to a tire circumferential direction are coated with rubber. The carcass plies 2 form a frame shape of the pneumatic tire 1 between the bead parts 9 on both sides in the tire axial direction and wrap the bead parts 9 by being turned up from the inside to the outside in the tire axial direction and wound up around the bead parts 9. Moreover, a rubber chafer 3 is provided at a place on an outer side in the tire axial direction of a turned-up portion 2a in the carcass plies 2.

A plurality of belts 4 is provided on an outer side in the tire radial direction of the carcass plies 2, and a belt reinforcing layer 5 is provided on an outer side in the tire radial direction of the belts 4. The belt 4 is a member formed of many steel cords coated with rubber. The belt reinforcing layer 5 is a member formed of many organic fiber cords coated with rubber. A tread rubber 6 is provided on an outer side in the tire radial direction of the belt reinforcing layer 5. Many grooves are formed on the tread rubber 6 to form a tread pattern.

Sidewall rubbers 7 are provided on both sides in the tire axial direction of the carcass plies 2. The tread rubber 6 and the sidewall rubber 7 overlap each other on a buttress; however, any of the tread rubber 6 and the sidewall rubber 7 may overlap on a tire surface side. A portion of the sidewall rubber 7 on an inner side in the tire radial direction extends close to the bead part 9 and covers part of the rubber chafer 3.

A rim line 8 that is a small protrusion with a height of approximately 1 mm is formed at a boundary between the sidewall rubber 7 and the rubber chafer 3 on the tire surface. The rim line 8 extends around the tire in the tire circumferential direction. It is also preferable that a rim protector protruding to make an approximately triangular shape in cross section is provided at the same place as the rim line 8 instead of the rim line 8. A range from the rim line 8 or the rim protector to a tread end in the tire radial direction is defined as a sidewall surface 10.

Here, the tread end means an end in the tire axial direction of a contact surface between the tread rubber 6 and a road surface when the tire is fitted to a normal rim in a state where a normal internal pressure is filled and a normal load is applied. Here, the normal rim is a rim specified by a standard for each tire in a standard system including the standard with which the tire complies, which includes, for example, a standard rim in JATMA and "measuring Rim" in TRA and ETRTO. Moreover, the normal internal pressure is an air pressure specified by each standard for each tire in the standard system including a standard with which the tire complies, which includes the maximum air pressure in JATMA, the maximum value described in the table "TIRE LOAD LIMITS AT VARIOUS COLD INFLATION PRESSURES" in TRA, and "INFLATION PRESSURE" in ETRTO in the case of tires for trucks and busses or tires for light trucks. The normal internal pressure is normally 180 kPa in the case of tires for passenger cars, but is set to 220 kPa in the case of tires on which "Extra Load" or "Reinforced" is written. Furthermore, the normal load is a load specified by each standard for each tire in the standard system including a standard with which the tire complies, which includes "the maximum load ability" in JATMA, the maximum value described in the table "TIRE LOAD LIMITS AT VARIOUS COLD INFLATION PRESSURES" in TRA, and "LOAD CAPACITY" in ETRTO. The normal load will be a load corresponding to 88% of above respective loads in the case of tires for passenger cars. The normal load is 392N when the tire is for a racing kart.

A sheet-shaped inner liner made of rubber with low air permeability is bonded to the inside of the carcass ply 2. In addition to these members, members such as a belt-under pad and a chafer are provided according to functional need of the tire.

Figure 2:
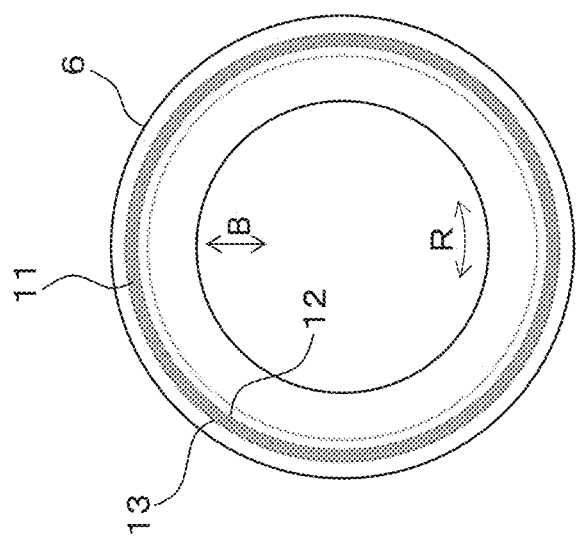
FIG. 2 is a view of a sidewall surface when seen from a tire axial direction.

As shown in FIG. 1 and FIG. 2, a decorative area 11 is provided on at least one of the sidewall surfaces 10 on both sides in the tire axial direction. The decorative area 11 has a ring shape centered at a tire rotation axis. The decorative area 11 is a band-shaped area with a fixed width, which is surrounded by an inner diameter-side line 12 having a circular shape with a small diameter and an outer diameter-side line 13 having a circular shape with a large diameter. The inner diameter-side line 12 and the outer diameter-side line 13 may be lines formed by recesses/protrusions or steps on the tire surface, or may be virtual lines not actually exist.

The decorative area 11 occupies part of a range from a position of the maximum width of the pneumatic tire 1 to the tread end. Here, the position of the maximum width of the pneumatic tire 1 is a position where a length in the tire axial direction from the surface of one sidewall surface 10 in the tire axial direction to the surface of the other sidewall surface 10 in the tire axial direction is the longest when the tire is fitted to the normal rim in the state where the normal internal pressure is filled and the normal load is applied. A width of the decorative area 11 (a length in the tire radial direction) is, for example, 5 mm or more to 50 mm or less.

The decorative area 11 may also be provided so as to include a place where a step tends to appear on the surface of the sidewall surface 10. The place where the step tends to appear on the surface of the sidewall surface 10 typically includes places at ends of tire constituting members. As such typical places, for example, there are a place where an interface between the tread rubber 6 and the sidewall rubber 7 appears on the tire surface, a place of a wound-up end of the carcass plies 2 (an end of the turned-up portion 2a of the carcass plies 2) in the tire axial direction, and the like.

Figure 3:
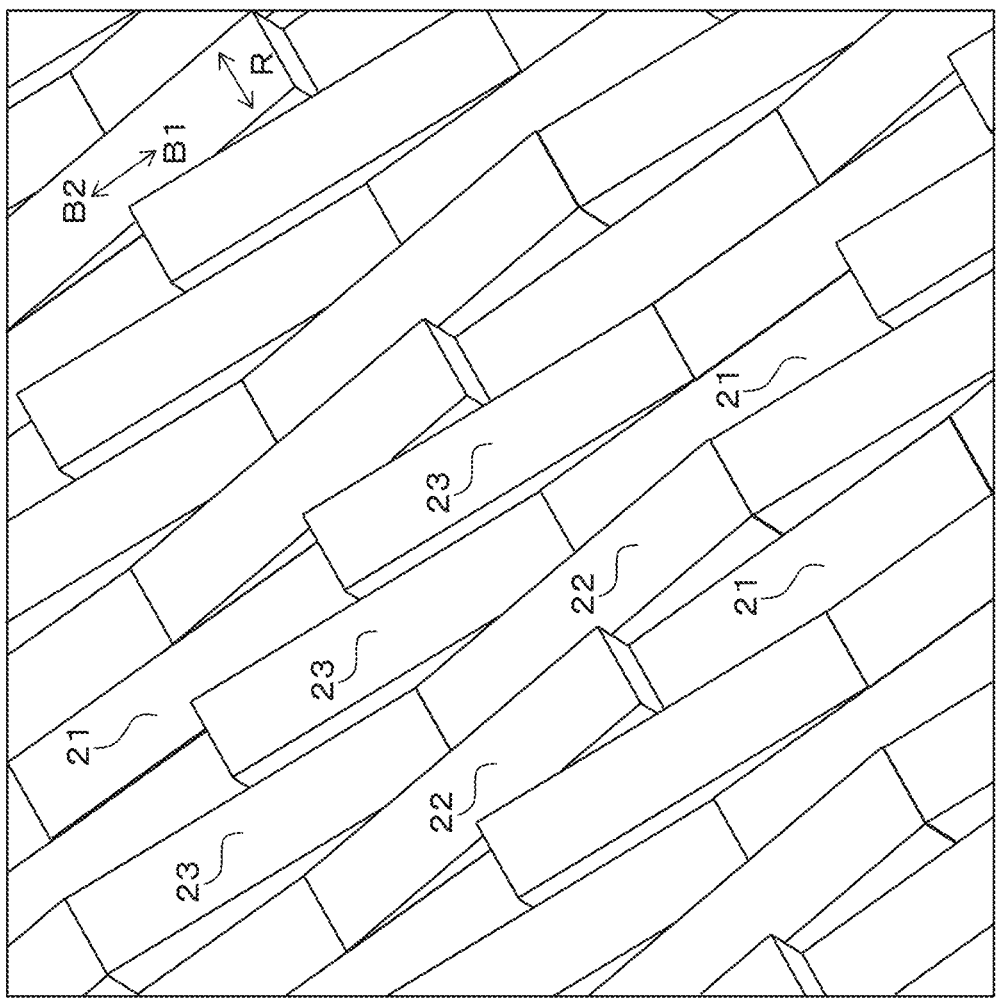
FIG. 3 is a perspective view of part of a decorative area.

Three kinds of planes 21, 22, and 23 are tightly arranged in the entire decorative area 11 as shown in FIG. 3. In the three kinds of planes 21, 22, and 23, existence of inclination and a direction of inclination with respect to a profile surface of the sidewall surface 10 differ. The first plane 21 is a plane which is parallel to the profile surface. The second plane 22 is a plane inclined so as to be higher on one side in a first direction with respect to the profile surface and so as to be lower on the other side in the first direction. The third plane 23 is a plane inclined so as to be lower on one side in the first direction with respect to the profile surface and so as to be higher on the other side in the first direction.

In the embodiment, the first direction is the tire radial direction, one side of the first direction is the inner side in the tire radial direction (a B1-side in FIG. 3 to FIG. 9), the other side in the first direction is the outer side in the tire radial direction (a B2-side in FIG. 3 to FIG. 9). A later-described second direction is the tire circumferential direction (an R-direction in FIG. 3 and FIG. 4).

Here, the profile surface of the sidewall surface 10 is a tire surface without irregularities such as decoration. The profile surface is one curved surface smoothly connecting areas without irregularities on both sides in the tire radial direction of the decorative area 11.

The inclination direction of the planes 21, 22, and 23 with respect to the profile surface is, strictly, the inclination direction of the planes 21, 22, and 23 with respect to a surface perpendicular to a normal line (which is a normal line passing the central position of each of the planes 21, 22, and 23) of the profile surface.

An inclination angle of the second plane 22 and the third plane 23 with respect to the profile surface is preferably 10 degrees or more to 30 degrees of less. A height from a lower side to a higher side of the second plane 22 and the third plane 23 in the direction perpendicular to the profile surface (the height is denoted by a symbol H in FIG. 9 for reference) is preferably 2 mm or more to 4 mm or less.

The three kinds of planes 21, 22, and 23 are rectangles having the same shape and size when seen from the direction perpendicular to the profile surface. In the embodiment, the planes 21, 22, and 23 are rectangles elongated in the tire radial direction. A ratio between a short side and a long side of the rectangle is preferably 1:1 to 1:20. A rectangle with a ratio of 1:1 is a square. The area of the planes 21, 22, and 23 is, for example, 3 $mm^2$ or more to 7 $mm^2$ or less when seen from the direction perpendicular to the profile surface.

It is preferable that the three kinds of planes 21, 22 and 23 can be recognized as the rectangle at a glance, and it is not always necessary that lengths or angles of respective parts strictly satisfy the definition of the rectangle numerically. For example, there may be a slight error between two facing sides of the rectangle. A difference between lengths of the two facing sides is preferably within 10% of a length of either one side. There may also be a slight error in an interior angle with respect to 90 degrees.

Figure 9:
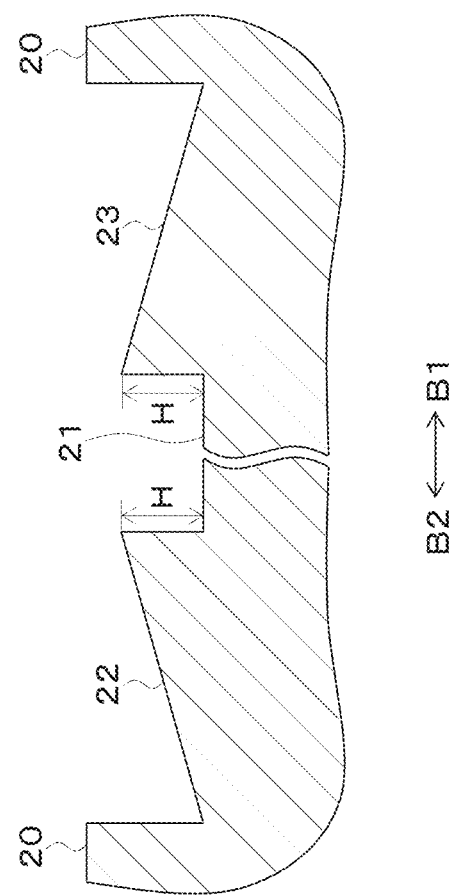
FIG. 9 is a cross-sectional view near an end of the decorative area in a tire radial direction.

All planes 21, 22, and 23 are provided in recesses with respect to the profile surface 20. Then, the entire decorative area 11 is recessed from the profile surface 20 as shown in FIG. 9. The first plane 21 which is parallel to the profile surface 20 corresponds to a bottom surface of the decorative area 11. The inclined second plane 22 and the third plane 23 are provided so that the lower side is placed at the bottom surface of the decorative area 11 and the higher side is placed at a position higher than the decorative area 11 and a position lower than the profile surface 20.

Irregularities are formed on the decorative area 11 by the above three kinds of planes 21, 22, and 23. Vicinities of the higher sides of the second plane 22 and the third plane 23 correspond to protrusions of the irregularities and the first plane 21 corresponds to recesses of the irregularities.

Arrangement of the three kinds of planes 21, 22, and 23 in the decorative area 11 has regularity. First, two kinds from the three kinds of planes 21, 22, and 23 are aligned in the tire radial direction as the first direction to make a pair. The two kinds of planes 21, 22, or 23 which make a pair contact each other.

In the embodiment, four kinds of pairs shown in FIG. 4 to FIG. 8 exist. The four kinds of pairs include a first pair (see FIG. 4 and FIG. 5) made by the second plane 22 on the outer side B2 in the tire radial direction and the first plane 21 on the inner side B1 in the tire radial direction, a second pair (see FIG. 4 and FIG. 6) made by the third plane 23 on the outer side B2 in the tire radial direction and the second plane 22 on the inner side B1 in the tire radial direction, a third pair (see FIG. 4 and FIG. 7) made by the third plane 23 on the outer side B2 in the tire radial direction and the first plane 21 on the inner side B1 in the tire radial direction, and a fourth pair (see FIG. 4 and FIG. 8) made by the first plane 21 on the outer side B2 in the tire radial direction and the third plane 23 on the inner side B1 in the tire radial direction.

Figure 4:
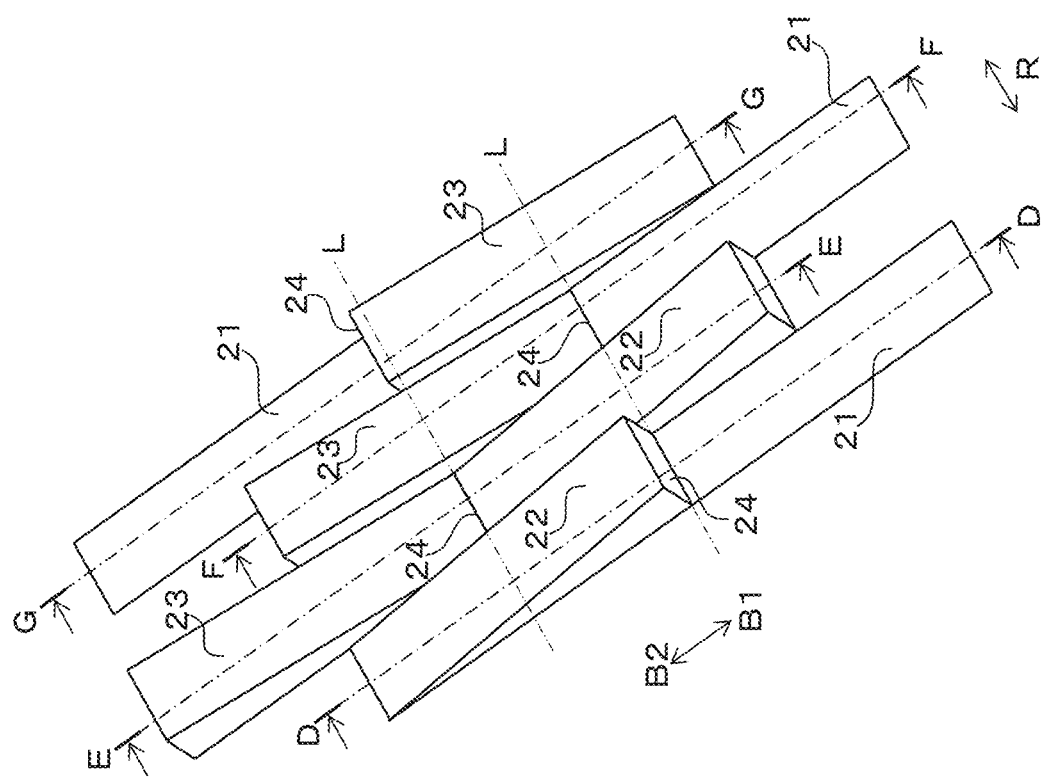
FIG. 4 is a view showing one aggregation in FIG. 3.
Figure 5:
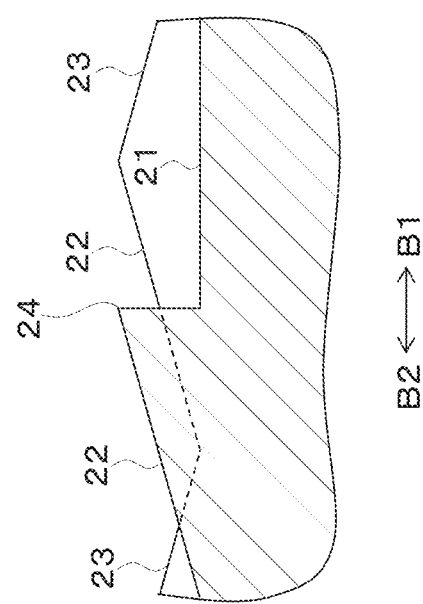
FIG. 5 is a cross-sectional view taken along D-D line of FIG. 4.
Figure 6:
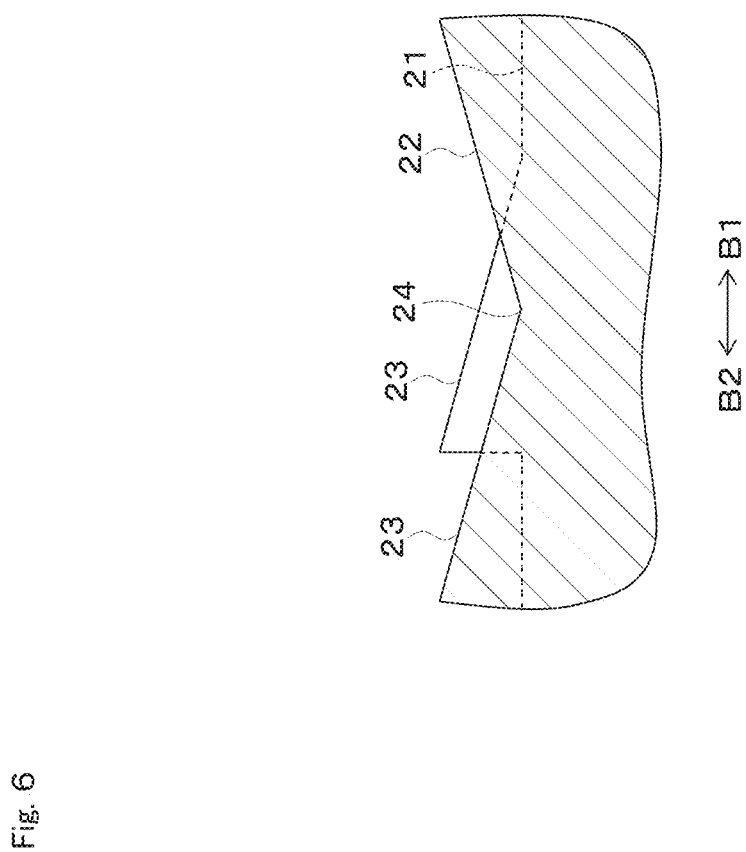
FIG. 6 is a cross-sectional view taken along E-E line of FIG. 4.
Figure 7:
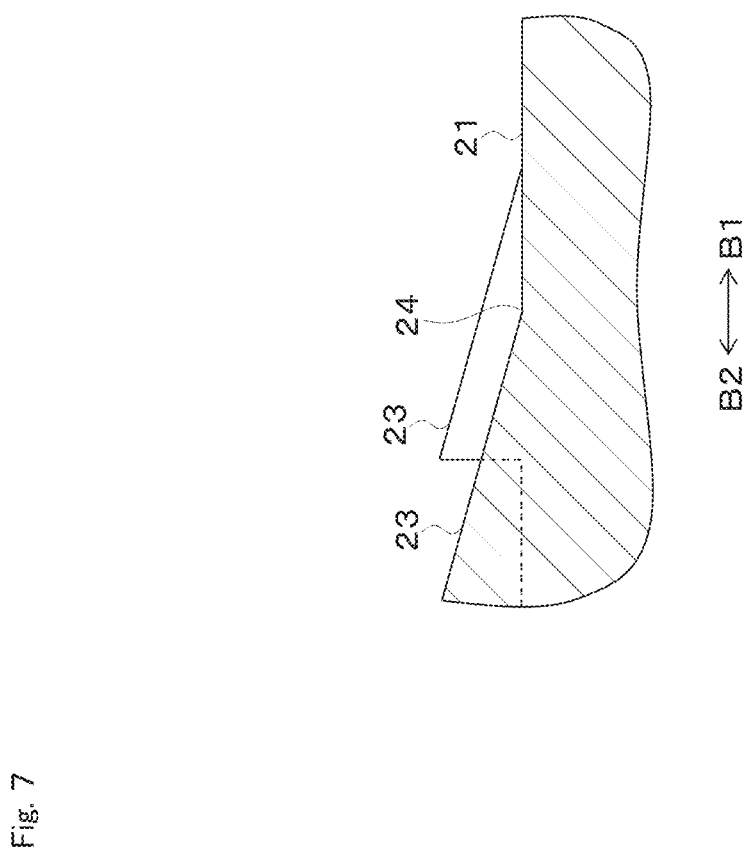
FIG. 7 is a cross-sectional view taken along F-F line of FIG. 4.
Figure 8:
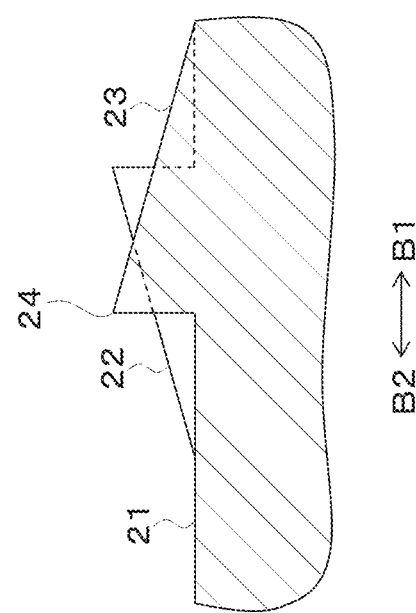
FIG. 8 is a cross-sectional view taken along G-G line of FIG. 4.

As shown in FIG. 4, FIG. 5, and FIG. 8, a step is formed at a boundary between two planes of the planes 21, 22, or 23 which make the pair in the first pair and the fourth pair. In the second pair and the third pair, a boundary between two planes of the planes 21, 22, or 23 which make the pair is bent. The boundary between two planes which make a pair will be referred to as a "boundary in the pair" in the following explanation.

The above-described four kinds of pairs are aligned in the tire circumferential direction R which is the second direction. The pairs are aligned in the order from the first pair to the fourth pair. The pairs adjacent to each other contact each other. One aggregation is formed by gathering the four kinds of pairs. The entire part shown in FIG. 4 corresponds to one aggregation. A plurality of aggregations is tightly arranged in the decorative area 11 without gaps.

As shown in FIG. 4, positions of the boundaries 24 in pairs are shifted in the tire radial direction (B1-B2 direction) between two pairs adjacent to each other in the tire circumferential direction R. A distance of shifting in the tire radial direction is half the length of each of the planes 21, 22, and 23 in the tire radial direction. Accordingly, the boundaries 24 in pairs in odd-numbered pairs (the first pair and the third pair) in the tire circumferential direction are aligned on one line, and the boundaries 24 in pairs in even-numbered pairs (the second pair and the fourth pair) in the tire circumferential direction are aligned on another one line. The lines on which the boundaries 24 in pairs pass are referred to as reference lines L (see FIG. 4). The reference lines L are virtual lines extending in the tire circumferential direction R.

As the boundaries 24 in pairs are shifted as described above, the two planes 21, 22, or 23 adjacent in the tire circumferential direction R are shifted in the tire radial direction (B1-B2 direction) by half the length of each of the planes 21, 22, and 23 in the tire radial direction.

The reference line L passing the boundary 24 in pair of a certain pair passes a central position of any of the planes 21, 22, and 23 in another pair adjacent in the tire circumferential direction R. A step is formed between two planes 21, 22, or 23 adjacent in the tire circumferential direction R on the reference line L. For example, as shown in FIG. 5, the boundary 24 in pair in the first pair (which is also an end of the second plane 22) is placed at a higher position than the second plane 22 in the second pair adjacent in the tire circumferential direction R. Then, a step is formed between the boundary 24 in pair of the first pair and the second plane 22 in the second pair. Similarly, as shown in FIG. 4, FIG. 6 to FIG. 8, steps are formed between each two planes 21, 22, or 23 adjacent in the tire circumferential direction R between the second pair and the third pair, between the third pair and the fourth pair, and between the fourth pair and the first pair.

It is also preferable that a marking or the like is provided on an outer side of the decorative area 11 on the sidewall surface 10, though not shown. The marking or the like is drawn by recesses/protrusions.

The decorative area 11 can be formed by a mold at the time of vulcanization molding of the pneumatic tire 1. Shapes of the plurality of planes 21, 22, and 23 are respectively formed on a molding surface of the mold used at the time of vulcanization molding.

As described above, in the pneumatic tire 1 according to the embodiment, three kinds of planes 21, 22, and 23 with different inclinations with respect to the profile surface are tightly arranged in the decorative area 11. Then, two kinds of planes from the planes 21, 22, and 23 are aligned in the tire radial direction to form the pair, and plural kinds of pairs in different combinations are aligned in the tire circumferential direction R. Furthermore, the boundaries 24 in pairs (boundaries between each two planes 21, 22, or 23 aligned in the tire radical direction) are shifted in the tire radial direction between the pairs adjacent in the tire circumferential direction R. Accordingly, new visual effects are created from the pneumatic tire 1.

Specifically, as three kinds of planes 21, 22, and 23 have different inclinations, light is reflected in different directions respectively. Then, the two kinds of planes 21, 22, or 23 make a pair, the plural kinds of pairs with different combinations are aligned in the tire circumferential direction R, and the boundaries 24 in pairs are shifted in the tire radial direction between two pairs adjacent in the tire circumferential direction; therefore, light is reflected toward various directions from many planes 21, 22, and 23 within a given range. Accordingly, complicated glitter such as on the water surface (water surface reflects light in many directions) is generated from the decorative area 11, which creates new visual effects.

Moreover, as irregularities are formed in the decorative area 11 by the planes 21, 22, and 23, the decorative area 11 looks three dimensional. As the decorative area 11 looks three dimensional, visibility of the decorative area 11 is increased.

It has been generally known that a streaky recess extending in the tire radial direction is generated on the sidewall surface at the time of so-called inflating for giving an internal pressure to the pneumatic tire 1. However, irregularities including the three kinds of planes 21, 22, and 23 are formed on the sidewall surface 10 in the present embodiment, which makes such streaky recess inconspicuous.

Here, the direction in which the two kinds of planes 21, 22, or 23 for forming the pair are aligned is the tire radial direction; therefore, light and shade in respective planes 21, 22, and 23 become clear when seeing the pneumatic tire 1 diagonally from above, which generates complicated glitter from the decorative area 11.

Moreover, the steps are formed between the planes 21, 22, or 23 adjacent in the tire circumferential direction R on the reference lines L passing the boundaries 24 of pairs and extending in the tire circumferential direction; therefore, light may be reflected from the planes 21, 22, and 23 adjacent in the tire circumferential direction R in different manners. Light is less likely to be reflected on the steps. Accordingly, complicated reflection of light occurs in areas of the plurality of pairs aligned in the tire circumferential direction R and a unique beauty is generated.

In the first pair and the fourth pair, the step is formed at the boundary between two planes (two planes aligned in the tire radial direction) which make a pair, and light is less likely to be reflected on the step. Accordingly, complicated reflection of light occurs in the decorative area 11 including the first pair and the fourth pair and the unique beauty is generated.

Furthermore, as the planes 21, 22, and 23 are rectangles elongated in the tire radial direction, the decorative area 11 looks shining more when seeing the pneumatic tire 1 diagonally from above. Since the planes 21, 22, and 23 are rectangles aligned in the tire radial direction while being along the profile surface which is a curved surface and being elongated in the tire radial direction, the streaky recess extending in the tire radial direction generated at the time of inflating is less likely to be conspicuous.

The decorative area 11 is a band-shaped area extending around the tire in the tire circumferential direction R, and the planes 21, 22, and 23 are tightly arranged in the band-shaped area; therefore, a sense of beauty is generated from the entire sidewall surface 10 in the circumferential direction.

Moreover, since the entire decorative area 11 is recessed from the profile surface of the sidewall surface 10, the planes 21, 22, and 23 are less likely to hit a curbstone or the like and are less likely to be damaged.

The above embodiment is merely an example, and a scope of the invention is not limited to the above embodiment. Various modifications may be made with respect to the above embodiment within a scope not departing from the gist of the invention. A plurality of modification examples will be explained below. Any one of the plural modification examples may be applied to the above embodiment as well as two or more examples of the plural modification examples may be combined and applied in a range where contradiction does not arise.

Modification Example 1

The decorative area may be an area with a given shape other than the ring. As given shapes, a marking, a shape of designed letters, a figure, and the like can be cited. The plurality of planes 21, 22, and 23 is tightly arranged in the area having such given shape in the same manner as in the embodiment. Accordingly, the marking and the like look beautiful.

Modification Example 2

Figure 10:
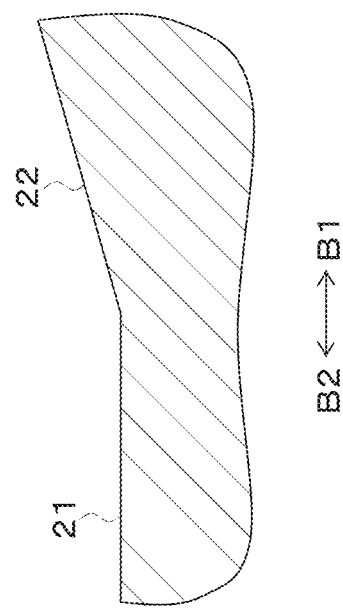
FIG. 10 is a cross-sectional view of a pair according to a modification example.
Figure 11:
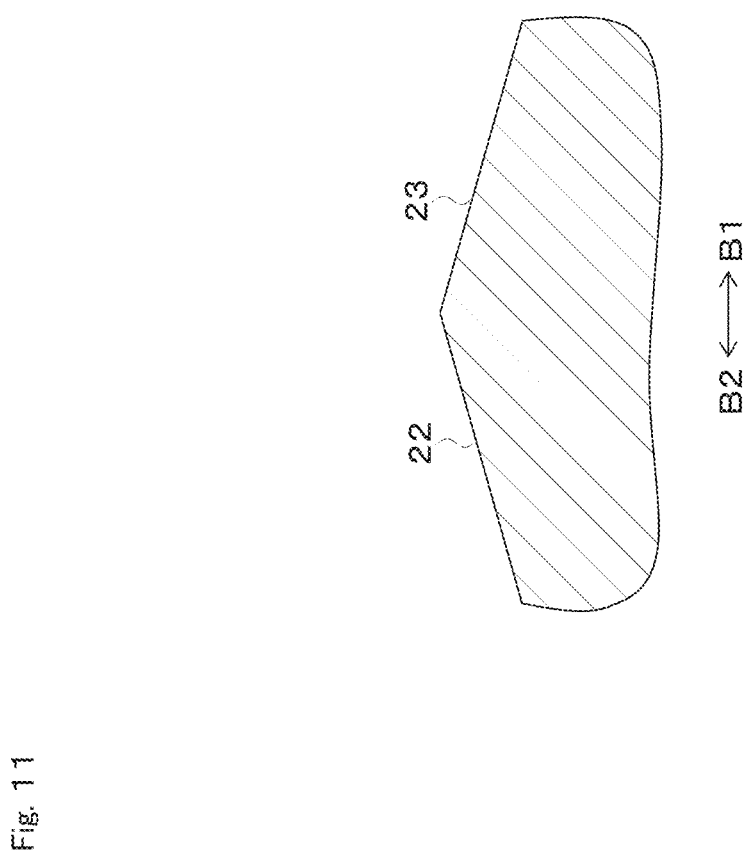
FIG. 11 is a cross-sectional view of a pair according to a modification example.

Pairs other than the first pair to the fourth pair in the above embodiment can be formed. Specifically, a pair made by the first plane 21 on the outer side B2 in the tire radial direction and the second plane 22 on the inner side B1 in the tire radial direction (FIG. 10), and a pair made by the second plane 22 on the outer side B2 in the tire radial direction and the third plane 23 on the inner side B1 in the tire radial direction (FIG. 11) can be formed.

Modification Example 3

The kinds of pairs included in one decorative area is not limited to four kinds as described above. It is preferable that plural kinds of pairs exist and pairs with different kinds are adjacent to each other in the second direction (for example, the tire circumferential direction). For example, only two kinds from the first pair to the fourth pair in the above embodiment may exist as pairs.

Modification Example 4

Contrary to the above embodiment, the first direction may be the tire circumferential direction, and the second direction may be the tire radial direction. In that case, two kinds of planes with different inclinations are aligned in the tire circumferential direction as the first direction to make a pair, and such pairs are aligned in the tire radial direction as the second direction. Then, between the pairs adjacent in the tire radial direction, boundaries in pairs (boundaries between each two planes aligned in the tire circumferential direction) are shifted in the tire circumferential direction. Also in this modification example, it is preferable that respective planes are rectangles elongated in the tire radial direction.

Modification Example 5

Respective planes may be rectangles elongated in the tire circumferential direction.

Modification Example 6

Figure 12:
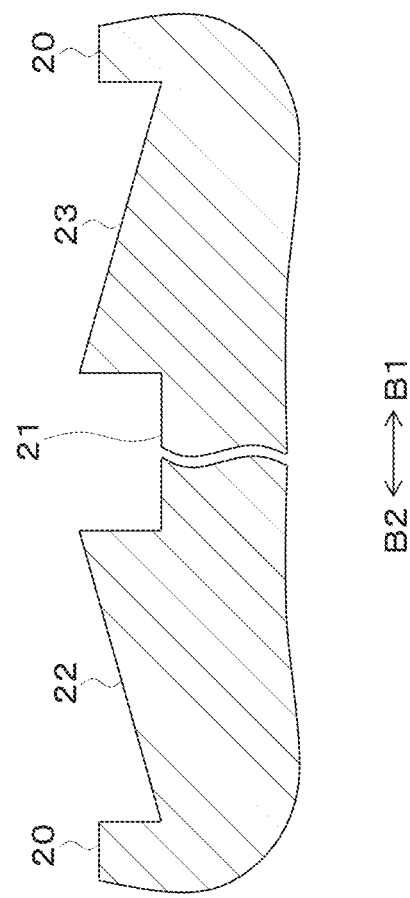
FIG. 12 is a cross-sectional view near the end of the decorative area in the tire radial direction according to a modification example.

A height of each plane from the profile surface is not limited. It is also preferable that lower sides of the second plane 22 and the third plane 23 are placed at a position lower than the profile surface 20, and higher sides thereof are placed at a position higher than the profile surface 20 as shown in FIG. 12. In that case, protrusions in irregularities formed by the planes 21, 22, and 23 protrude higher than the profile surface 20 to thereby make light easily shine on the protrusions, and recesses are recessed from the profile surface 20 to make light less likely to shine on the recesses. Accordingly, contrast between light and shade is strongly expressed.

Figure 13:
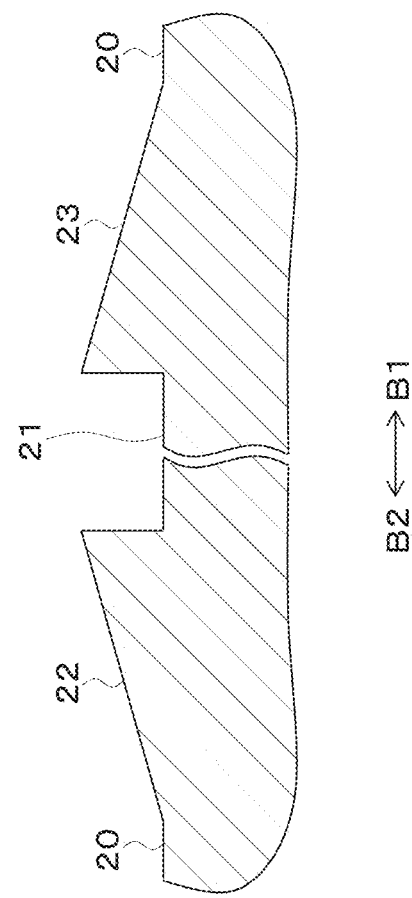
FIG. 13 is a cross-sectional view near the end of the decorative area in the tire radial direction according to a modification example.
Figure 14:
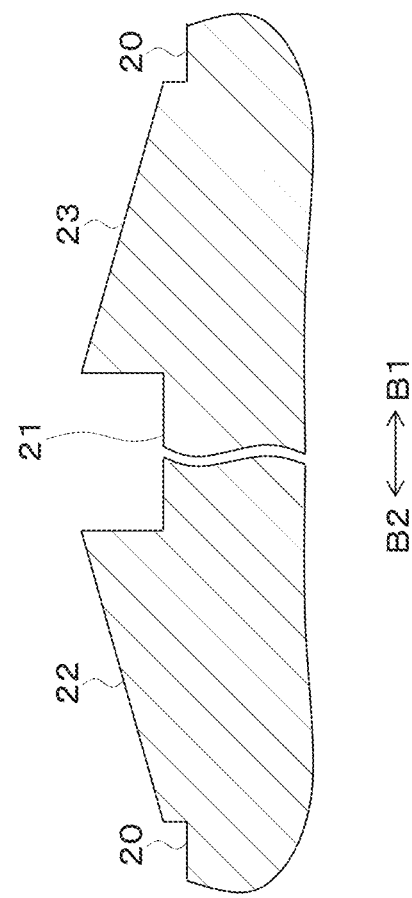
FIG. 14 is a cross-sectional view near the end of the decorative area in the tire radial direction according to a modification example.

It is also preferable that the first plane 21 is placed at the same height as the profile surface 20 as shown in FIG. 13. It is also preferable that all planes 21, 22, and 23 are placed higher than the profile surface 20 as shown in FIG. 14.

REFERENCE SIGNS LIST

1: pneumatic tire
2: carcass ply
2a: turned-up portion
3: rubber chafer
4: belt
5: belt reinforcing layer
6: tread rubber
7: sidewall rubber
8: rim line
9: bead part
9a: bead core
9b: bead filler
10: sidewall surface
11: decorative area
12: inner-diameter side line
13: outer-diameter side line
20: profile surface 21: first plane
22: second plane
23: third plane
24: boundary in pair

What is claimed is:

1. A pneumatic tire comprising:
a decorative area provided on a sidewall surface, wherein
three kinds of planes having an elongated rectangular shape with different inclinations with respect to a profile surface are tightly arranged in the decorative area,
the entire decorative area is recessed from the profile surface of the sidewall surface,
a first kind of plane included in the three kinds of planes having one high end and one low end,
a second kind of plane included in the three kinds of planes having one high end and one low end that are reversed relative to the one high end and the one low end of the first kind of plane,
a third kind of plane included in the three kinds of planes that is parallel to the profile surface,
the third kind of plane is a bottom surface of the decorative area,
the one low end of the first kind of plane and the one low end of the second kind of plane is located at the bottom surface of the decorative area,
the one high end of the first kind of plane and the one high end of the second kind of plane are positioned lower than the profile surface,
the first kind of plane and the second kind of plane are aligned in a first direction to make a first pair,
the first kind of plane and the third kind of plane are aligned in the first direction to make a second pair,
the second kind of plane and the third kind of plane are aligned in the first direction to make a third pair,
different combinations of the first pair, the second pair, and the third pair are aligned in a second direction, and
boundaries between each two planes aligned in the first direction are shifted in the first direction between the pairs adjacent in the second direction.

2. The pneumatic tire according to claim 1, wherein
a step is formed between the first kind of plane and the third kind of plane, or between the second kind of plane and the third kind of plane, on a line passing the boundaries between each two planes aligned in the first direction and extending in the second direction.

3. The pneumatic tire according to claim 1, wherein
the elongated rectangular shape is elongated in a tire radial direction.

4. The pneumatic tire according to claim 1, wherein
the decorative area is a band-shaped area extending around the tire in a tire circumferential direction, and
the plurality of planes is tightly arranged in the band-shaped area.

5. The pneumatic tire according to claim 1, wherein
the decorative area is an area with a given shape, and
the plurality of planes is tightly arranged in the inside of the area with the given shape.

6. The pneumatic tire according to claim 1, wherein
the first direction is the tire radial direction, and
the second direction is the tire circumferential direction.

7. The pneumatic tire according to claim 1, wherein
the decorative area is provided at an end place of a tire constituting member in a range from a position of the maximum width of the tire to a tread end, and
a width of the decorative area is 5 mm or more to 50 mm or less.

8. The pneumatic tire according to claim 1, wherein
an inclination angle, with respect to the profile surface, of the first kind of plane and the second kind of plane is 10 degrees or more to 30 degrees or less.

9. The pneumatic tire according to claim 1, wherein
the area of the three kinds of planes is 3 mm$^2$ or more to 7 mm$^2$ or less when seen from a direction perpendicular to the profile surface.

10. The pneumatic tire according to claim 1, wherein
a distance of shifting in the first direction of the boundaries between each two planes aligned in the first direction between the pairs adjacent in the second direction is half the length of each of the planes in the first direction.

* * * * *